US012331192B2

(12) United States Patent
Reimann et al.

(10) Patent No.: US 12,331,192 B2
(45) Date of Patent: *Jun. 17, 2025

(54) DIMER FATTY ACID-POLYESTER DIOL-BASED POLYMER, CONTAINING ISOCYANATE GROUPS

(71) Applicant: SIKA TECHNOLOGY AG, Baar (CH)

(72) Inventors: Sven Reimann, Zürich (CH); Nicole Kube, Unterengstringen (CH); Michael Schlumpf, Stallikon (CH)

(73) Assignee: SIKA TECHNOLOGY AG, Baar (CH)

( * ) Notice: Subject to any disclaimer, the term of this patent is extended or adjusted under 35 U.S.C. 154(b) by 943 days.

This patent is subject to a terminal disclaimer.

(21) Appl. No.: 17/418,502

(22) PCT Filed: Apr. 2, 2020

(86) PCT No.: PCT/EP2020/059393
§ 371 (c)(1),
(2) Date: Jun. 25, 2021

(87) PCT Pub. No.: WO2020/201421
PCT Pub. Date: Oct. 8, 2020

(65) Prior Publication Data
US 2022/0064440 A1    Mar. 3, 2022

(30) Foreign Application Priority Data

Apr. 5, 2019   (EP) .................... 19167575

(51) Int. Cl.
*C08L 75/06* (2006.01)
*C08G 18/10* (2006.01)
*C08G 18/42* (2006.01)
*C08G 18/48* (2006.01)

(52) U.S. Cl.
CPC ............ *C08L 75/06* (2013.01); *C08G 18/10* (2013.01); *C08G 18/4238* (2013.01); *C08G 18/4841* (2013.01); *C08G 2170/00* (2013.01); *C08G 2190/00* (2013.01)

(58) Field of Classification Search
CPC . C08G 18/4018; C08G 18/4288; C09J 175/04
See application file for complete search history.

(56) References Cited

U.S. PATENT DOCUMENTS

| | | | |
|---|---|---|---|
| 6,355,317 B1 | 3/2002 | Reid et al. | |
| 2003/0024639 A1* | 2/2003 | Paulsen | C09J 175/08 156/331.7 |
| 2012/0128991 A1* | 5/2012 | Kollbach | B32B 27/32 156/331.7 |
| 2014/0179813 A1* | 6/2014 | Kinzelmann | C08G 18/4887 521/131 |
| 2014/0364527 A1* | 12/2014 | Wintermantel | C08G 18/8019 521/174 |
| 2018/0305597 A1 | 10/2018 | Yao | |

FOREIGN PATENT DOCUMENTS

| | | | |
|---|---|---|---|
| EP | 0 289 945 A1 | 11/1988 | |
| EP | 2493951 B1 * | 7/2018 | ........... C08G 18/089 |
| JP | 2007-332241 A | 12/2007 | |
| JP | 2012-116879 A | 6/2012 | |
| WO | 01/40343 A1 | 6/2001 | |
| WO | 03/027160 A1 | 4/2003 | |
| WO | 03/070801 A1 | 8/2003 | |
| WO | 03/082944 A1 | 10/2003 | |
| WO | 2008/068038 A2 | 6/2008 | |
| WO | 2008/127926 A1 | 10/2008 | |
| WO | 2008/147845 A1 | 12/2008 | |
| WO | 2017/103070 A1 | 6/2017 | |
| WO | 2018/086029 A1 | 5/2018 | |
| WO | 2018/210568 A1 | 11/2018 | |

OTHER PUBLICATIONS

FIT translation of EP_2493951_B1_I (Year: 2024).*
Jun. 29, 2020 International Search Report issued in International Patent Application No. PCT/EP2020/059393.
Sep. 28, 2021 International Preliminary Report on Patentability issued in International Patent Application No. PCT/EP2020/059393.

* cited by examiner

*Primary Examiner* — Michael M Dollinger
(74) *Attorney, Agent, or Firm* — Oliff PLC

(57) ABSTRACT

A polyester urethane polymer containing isocyanate groups and being liquid at ambient temperature, obtained by reacting at least one monomeric diisocyanate and dimer fatty acid-based polyester diol having OH-number ranging between 28 and 120 mg KOH/g in NCO/OH ratio of at least 3/1, and by subsequently removing large part of monomeric diisocyanate by means of suitable separation process, wherein polymer has NCO content ranging between 1.5 and 6% by wt. and maximum monomeric diisocyanate content of 0.5% by wt. The polymer permits the production of moisture-curing polyurethane compositions for application in ambient temperatures, having improved properties in terms of open time, adhesion, application and weather resistance, with unchanged good properties of storage stability, curing rate, strength, ductility, elasticity and hazardous material classification. Compositions of this type are particularly suitable for use as elastic adhesives in replacement glass for vehicles.

17 Claims, No Drawings

DIMER FATTY ACID-POLYESTER DIOL-BASED POLYMER, CONTAINING ISOCYANATE GROUPS

TECHNICAL FIELD

The invention relates to polymers containing isocyanate groups and having a low monomer content, and to the use thereof in moisture-curing polyurethane compositions, especially for use as adhesive for replacement of glass in motor vehicles.

STATE OF THE ART

Curable compositions based on polyurethanes are often used as adhesives for elastic bonds, for example in motor vehicle construction. This requires good properties, especially with regard to storage stability, applicability, open time, curing rate, adhesion, strength, elasticity, weathering resistance and hazardous substance classification.

One-component moisture-curing systems are popular, particularly on account of their ease of handling. In general, these systems show good adhesion properties. However, there are applications on specific substrates on which the achievement of good adhesion presents difficulties. One example of this is the bonding of replacement panes in motor vehicles, where the bodywork flange as substrate has both regions with exposed paint and regions with residues of the old adhesive that are stuck to the paint, have not been completely removed or have been left as bonding substrate ("residual adhesive bead"). If the new adhesive does not adhere fully to the residual adhesive bead, the effects may be unwanted ingress of water or wind noise, or extend as far as detachment of the pane. The moisture-curing adhesives that are now available, without suitable pretreatment on the residual adhesive bead, often have only inadequate adhesion, especially when the old adhesive is significantly aged and hence has become hard or brittle. For the improvement of adhesion on the residual adhesive bead, it is possible to use known adhesion promoters, such as diisocyanate oligomers or derivatives thereof; however, this leads to losses in the elasticity of the adhesive after curing.

Polymers containing isocyanate groups, as are present as binder in one-component polyurethane adhesives and cure by reaction with moisture, are prepared by reaction of polyols with monomeric diisocyanates. Such polymers, on account of chain extension reactions, contain a residual monomeric diisocyanate content, typically in the range from 0.5% to 3% by weight. But monomeric diisocyanates are potentially harmful to health. Formulations containing monomeric diisocyanates, in particular above a concentration of 0.1% by weight, must be provided with hazard symbols and warning messages on the label and in the data sheets, and in some countries may be subject to regulations in respect of sale and use.

Polyurethanes containing dimer fatty acid-based polyester polyols are known. These are usually used as a constituent of the polyol component of two-component polyurethanes, for example in EP 2,144,944, in order to increase the hydrolysis and solvent resistance of elastomers, or in WO 2018/210568, in order to obtain high extension coupled with high strength.

EP 1,476,485 describes two-component polyurethanes for production of microcellular polyurethane foam, wherein the isocyanate component comprises a reaction product of dimer fatty acid-based polyester polyol and a large excess of diphenylmethane 4,4'-diisocyanate, which is then cured with a polyol component consisting mainly of further dimer fatty acid-based polyester polyol. The reaction product described here, owing to its high NCO content, is unsuitable for use in moisture-curing polyurethane compositions. In the curing of such compositions with moisture, blisters would form, and the elasticity and extensibility of the resulting product would be too low.

WO2017/103070 describes a moisture-curing polyurethane adhesive having high early strength, which is heated for application and comprises a polymer containing isocyanate groups, which is a reaction product prepared in multiple stages from a polyol mixture including dimer fatty acid-based polyol. This reaction product has very high viscosity, and its preparation is complex. On account of its poor expressibility, it is unsuitable for adhesives that are to be applicable at room temperature, and it does not enable the desired adhesion to residual adhesive bead.

SUMMARY OF THE INVENTION

It is an object of the present invention to provide an adhesion promoter for moisture-curing elastic polyurethane adhesives that are processible at room temperature, which improves the adhesion of the adhesive to difficult substrates such as residual adhesive bead, without losses in further relevant product properties, especially storage stability, applicability, curing rate, blister formation, strength, extensibility, elasticity and hazardous substance classification.

This object is achieved by a polymer as described in claim 1. The polymer is based on a monomeric diisocyanate, especially diphenylmethane 4,4'-diisocyanate, and a dimer fatty acid-based polyester diol. It has an NCO content in the range from 1.5% to 6% by weight and a monomeric diisocyanate content of not more than 0.5% by weight. The polymer of the invention is liquid at room temperature and has a narrow molecular weight distribution and a practically useful viscosity. It is of excellent suitability for use as an adhesion promoter in moisture-curing elastic polyurethane adhesives, where it has surprisingly good compatibility and especially distinctly improves adhesion to residual adhesive bead and the open time, without adversely affecting the curing rate, strength, extensibility and other relevant product properties. The positive effect on the adhesion properties and open time is surprising here since experience has shown that polymers containing isocyanate groups and having a low monomer content are more likely to be deleterious to good adhesion. On account of the low monomer content, it can also be used in a large amount without adversely affecting the hazardous substance classification of the adhesive. In addition, it improves the weathering resistance of polyurethane compositions, especially of carbon black-filled adhesives, as a result of which they have significantly less of a tendency to exude carbon black, and hence do not soil substrates even after prolonged use. Furthermore, the polymer of the invention results in a matt surface of the adhesive, which is very desirable by many users in the case of visible adhesive bonds.

Surprisingly, the dimer fatty acid-based polymer of the invention results in further unexpected advantages when used in moisture-curing polyurethane adhesives. What is particularly surprising is its positive influence on application properties. Such adhesives, even in the case of a low content of polymer of the invention, are particularly easily expressible from the container at room temperature and at low ambient and adhesive temperatures, with unchanged good sag resistance and short threading.

For improvement of initial strength, sag resistance and threading, moisture-curing polyurethane adhesives, especially for motor vehicle construction, often comprise a meltable component, typically a room temperature solid polyurethane polymer based on a crystalline polyester polyol. However, the expression force for the adhesive at room temperature and under cold conditions is increased by the meltable component, and sag resistance is highly shear-dependent, which can lead to problems in production and application. As a result of the use of the dimer fatty acid-based polymer of the invention, even polyurethane adhesives with a meltable component are surprisingly distinctly better expressible at room temperature and under cold conditions, and their rheological properties are significantly less shear-dependent. More particularly, the polymer of the invention enables adhesives where the meltable component can be used in a much smaller amount or omitted entirely.

The dimer fatty acid-based polyester urethane polymer of the invention enables moisture-curing elastic polyurethane compositions that are liquid, possibly pasty, and hence processable at room temperature, and have improved adhesion properties on specific substrates, especially residual adhesive bead, improved application properties, especially particularly good expressibility even at low temperatures, where the rise in expression force between room temperature and 5° C. is particularly small, long open time, a matt surface and better weathering resistance, combined with unchanged good properties in relation to storage stability, curing rate, blister formation, strength, extensibility, elasticity and hazardous substance classification.

Further aspects of the invention are the subject of further independent claims. Particularly preferred embodiments of the invention are the subject of the dependent claims.

Ways of Executing the Invention

The invention provides a room temperature liquid polyester urethane polymer containing isocyanate groups, obtained from the reaction of at least one monomeric diisocyanate and a dimer fatty acid-based polyester diol having an OH number in the range from 28 to 120 mg KOH/g in an NCO/OH ratio of at least 3/1, followed by removal of a majority of the monomeric diisocyanate by means of a suitable separation method, characterized in that it has an NCO content in the range from 1.5% to 6% by weight and a monomeric diisocyanate content of not more than 0.5% by weight.

"Monomeric diisocyanate" refers to an organic compound having two isocyanate groups separated from one another by a divalent hydrocarbyl radical having 4 to 15 carbon atoms.

A "polyester urethane polymer" refers to a polymer having ester groups as repeat units and additionally containing urethane groups.

A "dimer fatty acid-based polyester diol" refers to a polyester diol that has been prepared proceeding from a dimer fatty acid and/or a dimer fatty alcohol.

"NCO content" refers to the content of isocyanate groups in percent by weight based on the whole polymer.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is determined by means of gel permeation chromatography (GPC) against polystyrene as standard.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

"Room temperature" refers to a temperature of 23° C.

All industry standards and norms mentioned in this document relate to the versions valid at the date of first filing.

Percentages by weight (% by weight) refer to proportions by mass of a constituent of a composition or a molecule, based on the overall composition or the overall molecule, unless stated otherwise. The terms "mass" and "weight" are used synonymously in the present document.

The polymer of the invention may also be referred to as polyurethane prepolymer.

The polymer of the invention preferably has an NCO content in the range from 1.8% to 5% by weight, more preferably 2% to 4% by weight, especially 2.2% to 3.4% by weight. Such a polymer enables polyurethane compositions having an attractive combination of good expressibility, good adhesion properties and high strength.

The polymer of the invention preferably has a monomeric diisocyanate content of not more than 0.3% by weight, especially not more than 0.2% by weight. Such a polymer is particularly suitable for use in polyurethane compositions having less than 0.1% by weight of monomeric diisocyanates; these are safe to handle even without special safety precautions and can be sold in many countries without hazardous substance classification.

Suitable monomeric diisocyanates are commercially available aromatic, aliphatic or cycloaliphatic diisocyanates, especially diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI), naphthalene 1,5-diisocyanate (NDI), hexane 1,6-diisocyanate (HDI), 2,2 (4),4-trimethylhexamethylene 1,6-diisocyanate (TMDI), cyclohexane 1,3- or 1,4-diisocyanate, 1-isocyanato-3,3,5-trimethyl-5-isocyanatomethylcyclohexane (isophorone diisocyanate or IPDI), perhydro (diphenylmethane 2,4'- or 4,4'-diisocyanate) (HMDI), 1,3- or 1,4-bis(isocyanatomethyl)cyclohexane, m- or p-xylylene diisocyanate (XDI), or mixtures thereof.

The monomeric diisocyanate used for the reaction is preferably diphenylmethane 4,4'-diisocyanate (4,4'-MDI), tolylene 2,4-diisocyanate or mixtures thereof with tolylene 2,6-diisocyanate (TDI), 1-isocyanato-3,3,5-trimethyl-5-isocyanatomethylcyclohexane (IPDI) or hexane 1,6-diisocyanate (HDI). These diisocyanates are easily obtainable and inexpensive, and enable good mechanical strength. It is also possible to use a combination of two or more of these monomeric diisocyanates.

Particular preference is given to IPDI. Such a polymer is particularly suitable in moisture-curing polyurethane compositions having particularly high light stability.

Most preferred as monomeric diisocyanate is 4,4'-MDI. This 4,4'-MDI is especially of a quality that contains only small fractions of diphenylmethane 2,4'- and/or 2,2'-diisocyanate and is solid at room temperature. Such a polymer cures particularly rapidly and enables particularly high strengths.

The dimer fatty acid-based polyester diol used for the reaction is typically liquid at room temperature. It has an OH number in the range from 28 to 120 mg KOH/g.

Such dimer fatty acid-based polyester diols have an average molecular weight $M_n$ in the range from 950 to 4,000 g/mol. They have a largely linear structure and an average OH functionality of about 2.

The dimer fatty acid-based polyester diol is preferably amorphous.

Suitable dimer fatty acid-based polyester diols are especially obtained from the esterification of at least one dimer fatty acid and/or at least one dimer fatty alcohol with a diol, for example ethylene glycol or butanediol, and/or a dicarboxylic acid, for example adipic acid, at such a stoichiometry that the product is amorphous and is liquid at room temperature and has an OH number in the range from 28 to 120 mg KOH/g.

The dimer fatty acid-based polyester diol preferably contains a content of carbon atoms from renewable sources according to ASTM D6866 based on the total carbon content in the range from 50% to 100%, preferably 60% to 95%, especially 70% to 90%. Such a polyester diol is amorphous and hydrophobic, and has particularly good compatibility in polyurethane adhesives.

The dimer fatty acid-based polyester diol preferably has an OH number in the range from 34 to 120 mg KOH/g, especially 52 to 60 mg KOH/g. Such a dimer fatty acid-based polyester diol has an average molecular weight $M_n$ in the range from 950 to 3,300 g/mol, especially in the range from 1,900 to 2,200 g/mol. Such a polymer enables polyurethane compositions having a particularly attractive combination of good expressibility, good adhesion properties and high strength.

Especially suitable are commercially available amorphous dimer fatty acid-based polyester diols, especially the following grades obtainable under the Priplast® trade name: Priplast® 1837, 1838, 3187, 3196, 3197, 3199 or 3238 (from Croda). Among these, preference is given to Priplast® 1838.

The polymer of the invention is obtained from the reaction of at least one monomeric diisocyanate and the dimer fatty acid-based polyester diol in an NCO/OH ratio of at least 3/1.

The NCO/OH ratio is preferably in the range from 3/1 to 10/1, more preferably 3/1 to 8/1, especially 4/1 to 7/1, most preferably 5/1 to 7/1.

The reaction is preferably conducted with exclusion of moisture at a temperature in the range from 20 to 160° C., especially 40 to 140° C., optionally in the presence of suitable catalysts.

After the reaction, the monomeric diisocyanate remaining in the reaction mixture is removed by means of a suitable separation method down to the residual content described.

A preferred separation method is a distillative method, especially thin-film distillation or short-path distillation, preferably with application of reduced pressure.

Particular preference is given to a multistage method in which the monomeric diisocyanate is removed in a short-path evaporator with a jacket temperature in the range from 120 to 200° C. and a pressure of 0.001 to 0.5 mbar.

In the case of 4,4'-MDI, which is preferred as monomeric diisocyanate, distillative removal is particularly demanding. It has to be ensured, for example, that the condensate does not solidify and block the system. Preference is given to operating at a jacket temperature in the range from 160 to 200° C. at 0.001 to 0.5 mbar, and condensing the monomer removed at a temperature in the range from 40 to 60° C.

Preference is given to reacting the monomeric diisocyanate with the dimer fatty acid-based polyester diol and subsequently removing the majority of the monomeric diisocyanate remaining in the reaction mixture without the use of solvents or entraining agents.

Preference is given to subsequently reusing the monomeric diisocyanate removed after the reaction, i.e. using it again for the preparation of polymer containing isocyanate groups.

The polymer of the invention preferably has a viscosity at 20° C. of not more than 1,000 Pa·s, especially not more than 500 Pa·s. The viscosity at 20° C. is preferably in the range from 100 to 1,000 Pa·s, especially 100 to 500 Pa·s. The viscosity at 30° C. is preferably in the range from 50 to 500 Pa·s, especially 50 to 200 Pa·s. The viscosity at 40° C. is preferably in the range from 25 to 200 Pa·s, especially 25 to 100 Pa·s. The viscosity at 60° C. is preferably in the range from 5 to 25 Pa·s, especially 5 to 20 Pa·s. The viscosity is determined here with a cone-plate viscometer having a cone diameter 25 mm, cone angle 1°, cone tip-plate distance 0.5 mm, at a shear rate of 50 $s^{-1}$.

In the reaction, the OH groups of the dimer fatty acid-based polyester diol react with the isocyanate groups of the monomeric diisocyanate. This also results in what are called chain extension reactions, in that there is reaction of OH groups and/or isocyanate groups of reaction products between diol and monomeric diisocyanate. The higher the NCO/OH ratio chosen, the lower the level of chain extension reactions that takes place, and the lower the polydispersity and hence also the viscosity of the polymer obtained. A measure of the chain extension reaction is the average molecular weight of the polymer, or the breadth and distribution of the peaks in the GPC analysis. A further measure is the effective NCO content of the polymer freed of monomers relative to the theoretical NCO content calculated from the reaction of every OH group with a monomeric diisocyanate.

The NCO content in the polymer of the invention is preferably at least 75%, especially at least 80%, of the theoretical NCO content which is calculated from the addition of one mole of monomeric diisocyanate per mole of OH groups of the dimer fatty acid-based polyester diol. Such a polymer is of low viscosity and enables good application properties.

A particularly preferred polyester urethane polymer of the invention is obtained from the reaction of 4,4'-MDI and an amorphous dimer fatty acid-based polyester diol having an OH number in the range from 34 to 120 mg KOH/g, especially 52 to 60 mg KOH/g, in an NCO/OH ratio in the range from 4/1 to 10/1, followed by removal of 4,4'-MDI by means of distillation, and ultimately has an NCO content in the range from 2% to 5% by weight, especially 2.2% to 4% by weight, a monomeric diisocyanate content of not more than 0.3% by weight and a viscosity at 20° C. in the range from 100 to 1,000 Pa·s, preferably 100 to 500 Pa·s.

The polymer of the invention is liquid at room temperature and hence easy to handle, and on account of its low monomer content has only a mild hazardous substance classification, if any, and is suitable as adhesion promoter in moisture-curing elastic polyurethane adhesives, where it additionally improves application properties and weathering resistance.

The invention further provides for the use of the polyester urethane polymer of the invention as adhesion promoter in a moisture-curing polyurethane composition.

For use as adhesion promoter, the polyester urethane polymer of the invention is used in an amount in the range from 0.5% to 15% by weight, preferably 1% to 10% by weight, based on the overall polyurethane composition.

Use as an adhesion promoter improves the adhesion properties of the moisture-curing polyurethane composition. In particular, adhesion to residual adhesive bead is improved. This adhesion is important particularly in the replacement of panes in motor vehicles when the new pane is bonded in with moisture-curing polyurethane adhesive, in which case the substrate also includes residues of the old adhesive bead with which the pane replaced was bonded in. Very good adhesion to residual adhesive bead is important even when there is only a small amount of such residues on the substrate, since spots of incomplete adhesion can give rise to ingress of water or troublesome wind noise in the operation of the vehicle.

In the case of use as adhesion promoter, the polymer of the invention shows further desirable effects, such as an improvement in expressibility of the composition coupled with good, shear-independent sag resistance and short threading, a small rise in expression force under cold conditions, better weathering resistance and a matt surface of the composition, with no occurrence of losses in storage stability, in curing, in mechanical properties or in hazardous substance classification.

The invention further provides a moisture-curing polyurethane composition suitable as elastic adhesive and/or sealant, comprising
    at least one polyether urethane polymer containing isocyanate groups, and
    the described polyester urethane polymer containing isocyanate groups.

The moisture-curing polyurethane composition is preferably liquid, possibly pasty, at room temperature, and hence has good room temperature processibility.

The moisture-curing polyurethane composition preferably contains 0.5% to 15% by weight, preferably 1% to 10% by weight, of the polyester urethane polymer containing isocyanate groups.

A suitable polyether urethane polymer containing isocyanate groups is especially a polyether urethane polymer having a majority of polyoxypropylene structural units. Such a polymer is particularly suitable as the main binder for room temperature processible elastic adhesives and/or sealants having high extensibility.

The polyether segments in the polyether urethane polymer preferably consist of at least 80% 1,2-propyleneoxy units and optionally additionally 1,2-ethyleneoxy units.

The polyether urethane polymer containing isocyanate groups preferably has an average molecular weight $M_n$ in the range from 2,000 to 20,000 g/mol, preferably 3,000 to 15,000 g/mol.

It is preferably liquid at room temperature.

The polyether urethane polymer containing isocyanate groups preferably has an NCO content in the range from 1% to 5% by weight, especially 1% to 3% by weight.

A suitable polyether urethane polymer containing isocyanate groups is especially obtained from the reaction of at least one polyether polyol with a superstoichiometric amount of at least one monomeric diisocyanate. The reaction is preferably conducted with exclusion of moisture at a temperature in the range from 20 to 160° C., especially 40 to 140° C., optionally in the presence of suitable catalysts.

The NCO/OH ratio is preferably in the range from 1.3/1 to 10/1. The monomeric diisocyanate remaining in the reaction mixture after the reaction of the OH groups can be removed, especially by means of distillation.

If excess monomeric diisocyanate is removed by means of distillation, the NCO/OH ratio in the reaction is preferably in the range from 3/1 to 10/1, especially 4/1 to 7/1, and the resultant polymer containing isocyanate groups, after the distillation, preferably contains not more than 0.5% by weight, more preferably not more than 0.3% by weight, of monomeric diisocyanate.

Monomeric diisocyanate is especially removed here by means of short-path distillation under reduced pressure.

If no excess monomeric diisocyanate is removed from the polymer, the NCO/OH ratio in the reaction is preferably in the range from 1.3/1 to 2.5/1. Such a polyether urethane polymer especially contains not more than 3% by weight, preferably not more than 2% by weight, of monomeric diisocyanate.

Preferred monomeric diisocyanates are the aromatic, aliphatic or cycloaliphatic diisocyanates already mentioned, especially MDI, TDI, HDI or IPDI, or mixtures thereof.

Most preferred is 4,4'-MDI. This affords elastic adhesives and/or sealants having particularly high strength coupled with high extensibility.

Suitable polyether polyols are commercially available polyols or mixtures thereof, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or three active hydrogen atoms, especially a starter molecule such as water, ammonia or a compound having multiple OH or NH groups, for example ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those with styrene/acrylonitrile (SAN) particles or polyurea or polyhydrazodicarbonamide (PHD) particles.

Preferred polyether polyols are polyoxypropylene diols or polyoxypropylene triols, or what are called ethylene oxide-terminated (EO-capped or EO-tipped) polyoxypropylene diols or triols. The latter are polyoxyethylene/polyoxypropylene copolyols which are obtained especially by further alkoxylating polyoxypropylene diols or triols with ethylene oxide on conclusion of the polypropoxylation reaction, with the result that they have primary hydroxyl groups.

Preference is given to polyether polyols having an OH number in the range from 6 to 280 mg KOH/g, especially 7.5 to 112 mg KOH/g.

Preference is given to polyether polyols having an average molecular weight $M_n$ in the range from 400 to 20,000 g/mol, especially 1,000 to 15,000 g/mol.

Preference is given to polyether polyols having an average OH functionality in the range from 1.6 to 3.

In the preparation of the polyether urethane polymer containing isocyanate groups, it is also possible to include proportions of di- or polyfunctional alcohols.

In a preferred embodiment of the invention, the polyether urethane polymer containing isocyanate groups contains only a small content of monomeric diisocyanates. It preferably contains not more than 0.5% by weight, more preferably not more than 0.3% by weight, especially not more than 0.2% by weight, of monomeric diisocyanates. Such a polymer enables polyurethane compositions having a particularly attractive hazardous substance classification.

Particular preference is given to a polyether urethane polymer containing isocyanate groups and having an NCO content in the range from 1% to 2.5% by weight, especially 1.3% to 2.1% by weight, and a monomeric diisocyanate content of not more than 0.3% by weight, which is obtained from the reaction of at least one monomeric diisocyanate and a polyether triol having an average OH functionality in the range from 2.2 to 3 and an OH number in the range from 20 to 42 mg KOH/g in an NCO/OH ratio of at least 3/1 and subsequent removal of a majority of the monomeric diisocyanates by means of a suitable separation method. A preferred monomeric diisocyanate is IPDI or 4,4'-MDI, especially 4,4'-MDI.

Particular preference is further given to a linear polyether urethane polymer containing isocyanate groups and having an NCO content in the range from 1% to 2.5% by weight, especially 1.3% to 2.1% by weight, and a monomeric diisocyanate content of not more than 0.3% by weight, obtained from the reaction of at least one monomeric diisocyanate with a polyoxypropylene diol having an OH number in the range from 13 to 38 mg KOH/g, especially 22 to 32 mg KOH/g, in an NCO/OH ratio of at least 3/1 and subsequent removal of a majority of the monomeric diisocyanates by means of a suitable separation method. A preferred monomeric diisocyanate is IPDI or 4,4'-MDI, especially 4,4'-MDI.

Particular preference is further given to a mixture of these two particularly preferred polyether urethane polymers.

The moisture-curing polyurethane composition preferably additionally comprises at least one further constituent selected from meltable components, blocked amines, fillers, plasticizers, diisocyanate oligomers, catalysts and stabilizers.

In one embodiment of the invention, the moisture-curing polyurethane composition preferably additionally comprises at least one meltable component.

A suitable meltable component is especially a room temperature solid polyester urethane polymer containing isocyanate groups which is obtained from the reaction of at least one monomeric diisocyanate, especially 4,4'-MDI, and at least one crystalline polyester diol or polycarbonate diol.

Suitable polyester diols are especially OH-functional polyesters of adipic acid or sebacic acid or dodecanedicarboxylic acid with butane-1,4-diol or hexane-1,6-diol.

Suitable polycarbonate diols are especially OH-functional polycarbonates of hexane-1,6-diol.

Such a polymer is typically solid at room temperature and has at least partially crystalline character.

Such a meltable component is firstly suitable for adhesives that are applied in the heated state, for example at a temperature of about 60° C., and very quickly after application have a high initial strength, such that the bonded parts are self-supporting and need not be fixed. The meltable component here is in molten form in the heated adhesive on application, and crystallizes as the applied adhesive cools down. In addition, such a meltable component is suitable for adhesives that are applied at ambient temperature, where the meltable component is in crystallized form and results in an elevated sag resistance. However, the meltable component is difficult to handle, and the sag resistance achieved therewith is highly shear-dependent, which can lead to problems in production and application. Moreover, the meltable component makes it difficult to express the adhesive at room temperature and at cold ambient or adhesive temperatures.

The dimer fatty acid-based polyester urethane polymer of the invention enables adhesives having a certain proportion of meltable component and having better expressibility at room temperature and under cold conditions.

In addition, the dimer fatty acid-based polyester urethane polymer of the invention enables adhesives having very good sag resistance, in which the meltable component is used in a much smaller amount, or which are entirely free of meltable component.

In a further embodiment of the invention, the moisture-curing polyurethane composition preferably additionally comprises at least one blocked amine.

A suitable blocked amine preferably has at least one aldimino group or oxazolidino group. On contact with moisture, it is hydrolyzed with release of the amino group and reacts with available isocyanate groups, and can promote rapid, blister-free curing, a particularly nontacky surface and/or particularly good mechanical properties.

Preferred oxazolidines are monooxazolidines or bisoxazolidines, especially those derived from isobutyraldehyde, benzaldehyde or substituted benzaldehyde, especially benzaldehyde substituted in the para position by an optionally branched alkyl group having 10 to 14 carbon atoms.

Particular preference is given to monooxazolidines derived from N-alkylethanolamines such as N-n-butylethanolamine, or bisoxazolidines from the reaction of OH-functional monooxazolidines derived from diethanolamine with diisocyanates, especially hexane 1,6-diisocyanate.

Suitable aldimines are especially di- or trialdimines from the reaction of commercial primary di- or triamines with non-enolizable aldehydes. These are aldehydes that do not have a hydrogen atom in the alpha position to the carbon atom of the aldehyde group.

Preferred blocked amines are selected from aldimines of the formula (I) and (II)

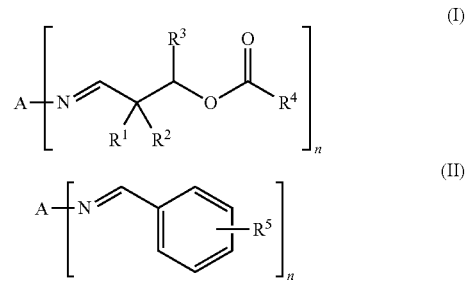

where n is 2 or 3,

A is an n-valent hydrocarbyl radical optionally including ether oxygen and having a molecular weight in the range from 28 to 6,000 g/mol, $R^1$ and $R^2$ are each independently a monovalent hydrocarbyl radical having 1 to 12 carbon atoms, or together are a divalent hydrocarbyl radical having 4 to 12 carbon atoms which is part of an optionally substituted carbocyclic ring having 5 to 8, preferably 6, carbon atoms, $R^3$ is a hydrogen radical or a linear or branched alkyl, arylalkyl or alkoxycarbonyl radical having 1 to 12 carbon atoms, $R^4$ is a hydrogen radical or a monovalent hydrocarbyl radical having 1 to 20 carbon atoms, and $R^5$ is an alkyl or alkoxy radical having 6 to 20 carbon atoms.

A is preferably an aliphatic, cycloaliphatic or arylaliphatic radical, especially having a molecular weight in the range from 28 to 500 g/mol, especially a radical selected from the group consisting of 1,6-hexylene, (1,5,5-trimethylcyclohexan-1-yl) methane-1,3, 4 (2)-methyl-1,3-cyclohexylene, 1,3-cyclohexylenebis(methylene), 1,4-cyclohexylenebis(methylene), 1,3-phenylenebis(methylene), 1,2-cyclohexylene, 1,3-cyclohexylene, 1,4-cyclohexylene, methylenebis(2-methylcyclohexan-4-yl), (bicyclo[2.2.1]heptane-2,5 (2,6)-diyl)dimethylene, (tricyclo[5.2.1.0$^{2,6}$]decan-3 (4), 8 (9)-diyl)dimethylene, a, @-polyoxypropylene having an average molecular weight $M_n$ in the range from 170 to 500 g/mol and trimethylolpropane- or glycerol-started tris(ω-polyoxypropylene) having an average molecular weight $M_n$ in the range from 330 to 500 g/mol.

Preferably, $R^1$ and $R^2$ are each methyl.

Preferably, $R^3$ is a hydrogen radical.

Preferably, $R^4$ is methyl or undecyl.

Preferably, $R^5$ is an optionally branched alkyl radical in the para position having 10 to 14 carbon atoms.

Particularly preferred blocked amines are selected from the group consisting of N,N'-bis(2,2-dimethyl-3-lauroyloxypropylidene) hexylene-1,6-diamine, N,N'-bis(2,2-dimethyl-3-acetoxypropylidene)-3-aminomethyl-3,5,5-trimethylcyclohexylamine, N,N'-bis(2,2-dimethyl-3-lauroyloxypropylidene)-3-aminomethyl-3,5,5-trimethylcyclohexylamine, N,N'-bis(4-C10-14-alkylbenzylidene)-3-aminomethyl-3,5,5-trimethylcyclohexylamine, N,N'-bis(2,2-dimethyl-3-acetoxypropylidene) polyoxypropylenediamine having an average molecular weight $M_n$ in the range from 450 to 880 g/mol, N,N'-bis(2,2-dimethyl-3-lauroyloxypropylidene) polyoxypropylenediamine having an average molecular weight $M_n$ in the range from 750 to 1,050 g/mol, N,N'-bis(4-C10-14-alkylbenzylidene) polyoxypropylenediamine having an average molecular weight $M_n$ in the range from 680 to 1,100 g/mol, N,N',N"-tris(2,2-dimethyl-3-acetoxypropylidene) polyoxypropylenetriamine having an average molecular weight $M_n$ in the range from 730 to 880 g/mol, N,N',N"-tris(2,2-dimethyl-3-lauroyloxypropylidene) polyoxypropylenetriamine having an average molecular weight $M_n$ in the range from 1,150 to 1,300 g/mol and N,N',N"-tris(4-C10-14-alkylbenzylidene) polyoxypropylenetriamine having an average molecular weight $M_n$ in the range from 1,000 to 1,350 g/mol.

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or lightweight fillers such as hollow glass beads or gas-filled plastic spheres (microspheres), especially the types obtainable under the Expancel® brand name (from Akzo Nobel).

Preference is given to calcium carbonates that have optionally been coated with fatty acids, especially stearates, calcined kaolins, finely divided silicas or industrially produced carbon blacks.

Suitable plasticizers are especially carboxylic esters, such as phthalates, especially diisononyl phthalate (DINP), diisodecyl phthalate (DIDP) or di(2-propylheptyl) phthalate (DPHP), hydrogenated phthalates or cyclohexane-1,2-dicarboxylates, especially hydrogenated diisononyl phthalate or diisononyl cyclohexane-1,2-dicarboxylate (DINCH), terephthalates, especially bis(2-ethylhexyl) terephthalate (DOTP) or diisononyl terephthalate (DINT), hydrogenated terephthalates or cyclohexane-1,4-dicarboxylates, especially hydrogenated bis(2-ethylhexyl) terephthalate or bis(2-ethylhexyl)cyclohexane-1,4-dicarboxylate, or hydrogenated diisononyl terephthalate or diisononyl cyclohexane-1,4-dicarboxylate, isophthalates, trimellitates, adipates, especially dioctyl adipate, azelates, sebacates, benzoates, glycol ethers, glycol esters, plasticizers having polyether structure, especially polypropylene oxide monools, diols or triols having blocked hydroxyl groups, especially in the form of acetate groups, organic phosphoric or sulfonic esters, polybutenes, polyisobutenes or plasticizers derived from natural fats or oils, especially epoxidized soybean or linseed oil.

Preferred plasticizers are phthalates or plasticizers having polyether structure.

Suitable diisocyanate oligomers are especially HDI biurets such as Desmodur® N 100 or N 3200 (from Covestro), Tolonate® HDB or HDB-LV (from Vencorex) or Duranate® 24A-100 (from Asahi Kasei); HDI isocyanurates such as Desmodur® N 3300, N 3600 or N 3790 BA (all from Covestro), Tolonate® HDT, HDT-LV or HDT-LV2 (from Vencorex), Duranate® TPA-100 or THA-100 (from Asahi Kasei) or Coronate® HX (from Tosoh Corp.); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik Industries); TDI oligomers such as Desmodur® IL (from Covestro); or mixed isocyanurates based on TDI/HDI, such as Desmodur® HL (from Covestro).

Suitable catalysts are catalysts for the acceleration of the reaction of isocyanate groups, especially organotin (IV) compounds such as, in particular, dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth (III) or zirconium (IV), especially with ligands selected from alkoxides, carboxylates, 1,3-diketonates, oxinate, 1,3-ketoesterates and 1,3-ketoamidates, or compounds containing tertiary amino groups, such as especially 2,2'-dimorpholinodiethyl ether (DMDEE).

If the moisture-curing polyurethane composition contains blocked amines, suitable catalysts are also catalysts for the hydrolysis of the blocked amino groups, especially organic acids, especially carboxylic acids such as 2-ethylhexanoic acid, lauric acid, stearic acid, isostearic acid, oleic acid, neodecanoic acid, benzoic acid, salicylic acid or 2-nitrobenzoic acid, organic carboxylic anhydrides such as phthalic anhydride, hexahydrophthalic anhydride or methylhexahydrophthalic anhydride, silyl esters of carboxylic acids, organic sulfonic acids such as methanesulfonic acid, p-toluenesulfonic acid or 4-dodecylbenzenesulfonic acid, sulfonic esters, other organic or inorganic acids, or mixtures of the aforementioned acids and acid esters. Particular preference is given to carboxylic acids, especially aromatic carboxylic acids, such as benzoic acid, 2-nitrobenzoic acid or especially salicylic acid.

Also especially suitable are combinations of different catalysts.

Suitable stabilizers are especially stabilizers against oxidation, heat, light or UV radiation, especially titanium dioxides, iron oxides, zinc oxides, benzophenones, benzotriazoles, compounds having 2,6-di-tert-butylphenol groups, as known, for example, under the Irganox® trade name (from BASF), compounds having 2,2,6,6-tetramethylpiperidine groups, called HALS (hindered amine light stabilizers), as known, for example, under the Tinuvin® trade name (from BASF), or phosphorus-containing compounds as known, for example, under the Irgafos® trade name (from BASF).

The moisture-curing polyurethane composition may contain further additions, especially

- inorganic or organic pigments, especially titanium dioxide, chromium oxides or iron oxides;
- fibers, especially glass fibers, carbon fibers, metal fibers, ceramic fibers, polymer fibers, such as polyamide fibers or polyethylene fibers, or natural fibers, such as wool, cellulose, hemp or sisal;
- nanofillers such as graphene or carbon nanotubes;
- dyes;
- desiccants, especially molecular sieve powder, calcium oxide, highly reactive isocyanates such as p-tosyl isocyanate, monooxazolidines such as Incozol® 2 (from Incorez) or orthoformic esters;
- adhesion promoters, especially organoalkoxysilanes, especially epoxysilanes, such as especially 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;
- further catalysts which accelerate the reaction of the isocyanate groups;
- rheology modifiers, especially thickeners, especially sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;
- solvents, especially acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerol formal or 2,5,7,10-tetraoxaundecane (TOU), toluene, xylene, heptane, octane, naphtha, white spirit, petroleum ether or gasoline, especially Solvesso™ grades (from Exxon), and propylene carbonate, dimethyl carbonate, butyrolactone, N-methylpyrrolidone, N-ethylpyrrolidone, p-chlorobenzotrifluoride or benzotrifluoride;
- natural resins, fats or oils, such as rosin, shellac, linseed oil, castor oil or soybean oil;
- nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene/vinyl acetate copolymers (EVA) or atactic poly-α-olefins (APAO);
- flame-retardant substances, especially the aluminum hydroxide or magnesium hydroxide fillers already mentioned, and also especially organic phosphoric acid esters, such as especially triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris (2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenylphosphate), bisphenol A bis(diphenylphosphate) or ammonium polyphosphates;
- additives, especially wetting agents, levelling agents, defoamers, deaerating agents or biocides;
- or further substances customarily used in moisture-curing polyurethane compositions.

It may be advisable to chemically or physically dry certain substances before mixing them into the composition.

Preferably, the polyurethane composition of the invention contains little solvent. It especially contains less than 5% by weight, preferably less than 2.5% by weight, of solvent. Most preferably, the polyurethane composition of the invention is essentially free of solvents.

The moisture-curing polyurethane composition preferably contains

- 20% to 60% by weight of polyether urethane polymer containing isocyanate groups,
- 0.5% to 10% by weight of inventive dimer fatty acid-based polyester urethane polymer containing isocyanate groups,
- 0% to 5% by weight of meltable component,
- 20% to 60% by weight of fillers,
- 0% to 35% by weight of plasticizers, and optionally further constituents, especially blocked amines, diisocyanate oligomers, catalysts or stabilizers.

The moisture-curing polyurethane composition of the invention preferably contains a total of less than 0.1% by weight of monomeric diisocyanates. Such a composition can be transported and sold in many countries without hazardous substance classification.

The moisture-curing polyurethane composition is especially produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The moisture-curing polyurethane composition may be in the form of a one-component composition or in the form of a multi-component, especially two-component, composition.

A composition referred to as a "one-component" composition is one in which all constituents of the composition are in the same container and which is storage-stable per se.

A composition referred to as a "two-component" composition is one in which the constituents of the composition are in two different components which are stored in separate containers and are not mixed with one another until shortly before or during the application of the composition.

The moisture-curing polyurethane composition is preferably a one-component composition. Given suitable packaging and storage, it is storage-stable, typically over several months, up to one year or longer.

On application of the moisture-curing polyurethane composition, the process of curing commences. This results in the cured composition.

In the case of a one-component composition, it is applied as such and then begins to cure under the influence of moisture or water. For acceleration of the curing, an accelerator component containing water and optionally a catalyst and/or a curing agent can be mixed into the composition on application, or the composition, after application thereof, can be contacted with such an accelerator component.

In the course of curing, the isocyanate groups react with one another under the influence of moisture. If the moisture-curing polyurethane composition contains a blocked amine, the isocyanate groups additionally react with the blocked amino groups as they are hydrolyzed. The totality of these reactions of isocyanate groups that lead to the curing of the composition is also referred to as crosslinking.

The moisture required for the curing of the moisture-curing polyurethane composition preferably gets into the composition through diffusion from the air (atmospheric moisture). In the process, a solid layer of cured composition ("skin") is formed on the surfaces of the composition which come into contact with air. The curing continues in the direction of diffusion from the outside inward, the skin becoming increasingly thick and ultimately encompassing the entire composition applied. The moisture can also get into the composition additionally or entirely from one or more substrate(s) to which the composition has been applied and/or can come from an accelerator component which is mixed into the composition on application or is contacted therewith after application, for example by painting or spraying.

The moisture-curing polyurethane composition is preferably applied at ambient temperature, especially in the range from about-10 to 50° C., preferably in the range −5 to 45° C., especially 0 to 40° C.

If desired, the moisture-curing polyurethane composition can also be applied in the heated state, for example at a temperature of about 60° C.

The moisture-curing polyurethane composition is preferably cured at ambient temperature.

The moisture-curing polyurethane composition has a long processing time (open time) and rapid curing.

"Open time" refers to the period of time during which the composition can be processed or reprocessed after application without any loss of its ability to function. If the composition is used as adhesive, the open time especially also refers to the period of time within which a bond must have been made after application thereof in order to develop sufficient adhesion. In the case of a one-component composition, the open time has been surpassed at the latest when a skin has formed or when there is no longer sufficient buildup of adhesion to the substrates.

The moisture-curing polyurethane composition is preferably used as elastic adhesive and/or sealant, especially for bonding or sealing applications in the construction and manufacturing industry or in motor vehicle construction, especially for parquet bonding, assembly, bonding of installable components, module bonding, pane bonding, join sealing, bodywork sealing, seam sealing or cavity sealing.

Elastic bonds in motor vehicle construction are, for example, the bonded attachment of parts such as plastic covers, trim strips, flanges, fenders, driver's cabins or other installable components to the painted body of a motor vehicle, or the bonding of panes into the vehicle body, said motor vehicles especially being automobiles, trucks, buses, rail vehicles or ships. Particular preference is given to use as adhesive for the replacement of glass in motor vehicles.

The moisture-curing polyurethane composition is preferably formulated such that it has a pasty consistency with structurally viscous properties. A composition of this kind is applied by means of a suitable device, for example from commercial cartridges or drums or hobbocks, especially in the form of a bead, which may have an essentially round or triangular cross-sectional area.

Suitable substrates which can be bonded and/or sealed with the moisture-curing polyurethane composition are especially
  glass, glass ceramic or screenprinted ceramic-coated glass or polycarbonate;
  metals or alloys, such as aluminum, copper, iron, steel, nonferrous metals, including surface-finished metals or alloys, such as zinc-plated or chromium-plated metals;
  coated or painted substrates, especially powder-coated metals or alloys or painted sheet metal;
  paints or varnishes, especially automotive topcoats;
  cured adhesives, especially based on polyurethane, silane-modified polymer or polysulfide, especially aged adhesives (residual adhesive bead), or bodywork flange having residual adhesive bead everywhere or in places;
  plastics, such as rigid or flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;
  fiber-reinforced plastics, such as carbon fiber-reinforced plastics (CFP), glass fiber-reinforced plastics (GFP) and sheet molding compounds (SMC);
  repair or leveling compounds based on PCC (polymer-modified cement mortar) or ECC (epoxy resin-modified cement mortar);
  insulation foams, especially made of EPS, XPS, PUR, PIR, rock wool, glass wool or foamed glass;
  concrete, mortar, cement screed, fiber cement, especially fiber cement boards, brick, tile, gypsum, especially gypsum boards or anhydrite screed, or natural stone, such as granite or marble, painted tiles or painted concrete, asphalt or bitumen;
  leather, textiles, paper, wood, wood materials bonded with resins, such as phenolic, melamine or epoxy resins, resin/textile composites or further materials called polymer composites.

If required, the substrates can be pretreated prior to application, especially by physical and/or chemical cleaning methods or the application of an activator or a primer.

It is possible to bond and/or seal two identical or two different substrates.

The invention further provides a method of bonding or sealing, comprising the steps of
  (i) applying the moisture-curing polyurethane composition described
    to a first substrate and contacting the composition with a second substrate within the open time of the composition, or
    to a first and to a second substrate and joining the two substrates within the open time of the composition, or
    between two substrates,
  (ii) curing the composition by contact with moisture.

At least one of the substrates is preferably selected from the group consisting of glass, glass ceramic, screenprinted ceramic-coated glass or polycarbonate, metals, alloys, powder-coated metals or alloys, paints and varnishes and cured adhesive, especially residual adhesive bead, and/or sheet metal painted with automotive topcoats.

The application and curing of the moisture-curing polyurethane composition or the method of bonding or sealing affords an article bonded or sealed with the composition. This article may be a built structure or a part thereof, especially a built structure in civil engineering above or below ground, a bridge, a roof, a staircase or a façade, or it may be an industrial good or a consumer good, especially a window, a pipe, a rotor blade of a wind turbine, a domestic appliance or a mode of transport, such as especially an automobile, a bus, a truck, a rail vehicle, a ship, an aircraft or a helicopter, or an installable component thereof.

The invention thus further provides an article obtained from the described method of bonding or sealing.

Particular preference is given to using the method of bonding for the elastic bonding of panes to motor vehicles, especially for the replacement of glass.

The moisture-curing polyurethane composition has advantageous properties. It has particularly good bonding properties coupled with long open time, especially when residual adhesive bead, particularly good application properties, especially particularly good expressibility coupled with high sag resistance and short threading, a matt surface after curing and particularly good weathering resistance, coupled with unchanged good curing, strength, extensibility, elasticity and hazardous substance classification. The composition is thus particularly suitable as elastic adhesive in motor vehicle construction, especially for the replacement of faulty, elastically bonded windshields on automobiles.

EXAMPLES

Working examples are adduced hereinafter, which are intended to elucidate the invention described. The invention is of course not limited to these described working examples.

"Standard climatic conditions" ("SCC") refer to a temperature of 23±1° C. and a relative air humidity of 50±5%.

Unless otherwise stated, the chemicals used were from Sigma-Aldrich Chemie GmbH.

Polyols Used:

| | |
|---|---|
| Priplast ® 1837: | dimer fatty acid-based amorphous polyester diol, OH number 110 mg KOH/g, liquid at room temperature (from Croda) |
| Priplast ® 1838: | dimer fatty acid-based amorphous polyester diol, OH number 56 mg KOH/g, liquid at room temperature (from Croda) |
| Priplast ® 3196: | dimer fatty acid-based amorphous polyester diol, OH number 37 mg KOH/g, liquid at room temperature (from Croda) |
| Priplast ® 3197: | dimer fatty acid-based amorphous polyester diol, OH number 56 mg KOH/g, liquid at room temperature (from Croda) |
| Desmophen ® 5031 BT: | glycerol-started ethylene oxide-terminated polyoxypropylene triol, OH number 28 mg KOH/g (from Covestro) |
| Acclaim ® 4200: | polyoxypropylene diol, OH number 28 mg KOH/g (from Covestro) |
| Dynacoll ® 7360 | room temperature solid, semicrystalline polyester diol, OH number 34 mg KOH/g (from Evonik) |

Preparation of Polymers Containing Isocyanate Groups:

Viscosity was measured with a thermostated Rheotec RC30 cone-plate viscometer (cone diameter 25 mm, cone angle 1°, cone tip-plate distance 0.5 mm, shear rate 50 s$^{-1}$).

Monomeric diisocyanate content was determined by means of HPLC (detection via photodiode array; 0.04 M sodium acetate/acetonitrile as mobile phase) after prior derivatization by means of N-propyl-4-nitrobenzylamine.

Polymer DP-1:

597.5 g of Priplast® 1838 and 402.5 g of diphenylmethane 4,4'-diisocyanate (Desmodur® 44 MC L, from Covestro) were reacted at 80° C. to give a polyester urethane polymer having an NCO content of 11.0% by weight, a viscosity of 36 Pa·s at 20° C. and a diphenylmethane 4,4'-diisocyanate content of about 26% by weight.

Subsequently, the volatile constituents, especially a majority of the diphenylmethane 4,4'-diisocyanate, were removed by distillation in a short-path evaporator (jacket temperature 180° C., pressure 0.1 to 0.005 mbar, condensation temperature 47° C.). The polyester urethane polymer thus obtained was slightly cloudy and was of fluid, viscous consistency at room temperature. It had an NCO content of 2.8% by weight, a viscosity of 312 Pa·s at 20° C., 119 Pa·s at 30° C., 48 Pa·s at 40° C. and 11.5 Pa·s at 60° C., and a diphenylmethane 4,4'-diisocyanate content of 0.09% by weight.

Polymer DP-2:

445.0 g of Priplast® 1837 and 555.0 g of diphenylmethane 4,4'-diisocyanate (Desmodur® 44 MC L, from Covestro) were reacted at 80° C. to give a polyester urethane polymer having an NCO content of 14.8% by weight, a viscosity of 6.5 Pa·s at 20° C. and a diphenylmethane 4,4'-diisocyanate content of about 35% by weight.

Subsequently, the volatile constituents, especially a majority of the diphenylmethane 4,4'-diisocyanate, were removed as described for polymer DP-1. The polyester urethane polymer thus obtained was slightly cloudy and was of fluid, viscous consistency at room temperature. It had an NCO content of 4.8% by weight, a viscosity of 11 Pa·s at 60° C. and a diphenylmethane 4,4'-diisocyanate content of 0.06% by weight.

Polymer DP-3:

663.0 g of Priplast® 3196 and 337.0 g of diphenylmethane 4,4'-diisocyanate (Desmodur® 44 MC L, from Covestro) were reacted at 80° C. to give a polyester urethane polymer having an NCO content of 9.4% by weight, a viscosity of 57 Pa·s at 20° C. and a diphenylmethane 4,4'-diisocyanate content of about 23% by weight.

Subsequently, the volatile constituents, especially a majority of the diphenylmethane 4,4'-diisocyanate, were removed as described for polymer DP-1. The polyester urethane polymer thus obtained was slightly cloudy and was of fluid, viscous consistency at room temperature. It had an NCO content of 2.2% by weight, a viscosity of 17 Pa·s at 60° C. and a diphenylmethane 4,4'-diisocyanate content of 0.06% by weight.

Polymer DP-4:

600.0 g of Priplast® 3197 and 400.0 g of diphenylmethane 4,4'-diisocyanate (Desmodur® 44 MC L, from Covestro) were reacted at 80° C. to give a polyester urethane polymer having an NCO content of 10.7% by weight, a viscosity of 28 Pa·s at 20° C. and a diphenylmethane 4,4'-diisocyanate content of about 25% by weight.

Subsequently, the volatile constituents, especially a majority of the diphenylmethane 4,4'-diisocyanate, were removed as described for polymer DP-1. The polyester urethane polymer thus obtained was slightly cloudy and was of fluid, viscous consistency at room temperature. It had an NCO content of 2.8% by weight, a viscosity of 16 Pa·s at 60° C. and a diphenylmethane 4,4'-diisocyanate content of 0.08% by weight.

Polymer DP-5:

620.0 g of Priplast® 1838 and 379.9 g of 1-isocyanato-3,3,5-trimethyl-5-isocyanatomethylcyclohexane (Vestanat® IPDI, from Evonik) were reacted in the presence of 0.01 g of dibutyltin dilaurate at 80° C. to give a polyester urethane polymer having an NCO content of 11.8% by weight, a viscosity of 17 Pa·s at 20° C. and a 1-isocyanato-3,3,5-trimethyl-5-isocyanatomethylcyclohexane content of about 20% by weight. Subsequently, the volatile constituents, especially a majority of the 1-isocyanato-3,3,5-isocyanatomethylcyclohexane, were removed by distillation in a short-path evaporator (jacket temperature 160° C., pressure 0.1 to 0.005 mbar). The polyester urethane polymer thus obtained was slightly cloudy and was of fluid, viscous consistency at room temperature. It had an NCO content of 3.1% by weight, a viscosity of 153 Pa·s at 20° C. and a 1-isocyanato-3,3,5-trimethyl-5-isocyanatomethylcyclohexane content of 0.23% by weight.

Polymer PP-1:

725.0 g of Desmophen® 5031 BT and 275.0 g of diphenylmethane 4,4'-diisocyanate (Desmodur® 44 MC L, from Covestro) were reacted by a known method to give a polyether urethane polymer having an NCO content of 7.6% by weight, a viscosity of 6.5 Pa·s at 20° C. and a diphenylmethane 4,4'-diisocyanate content of about 20% by weight.

Subsequently, the volatile constituents, especially a majority of the diphenylmethane 4,4'-diisocyanate, were removed as described for polymer DP-1. The polyether urethane polymer thus obtained had an NCO content of 1.7% by weight, a viscosity of 19 Pa·s at 20° C. and a diphenylmethane 4,4'-diisocyanate content of 0.04% by weight.

Polymer PP-2:

727.0 g of Acclaim® 4200 and 273.0 g of diphenylmethane 4,4'-diisocyanate (Desmodur® 44 MC L, from Covestro) were reacted by a known method to give a polyether urethane polymer having an NCO content of 7.6% by weight, a viscosity of 5.2 Pa·s at 20° C. and a diphenylmethane 4,4'-diisocyanate content of about 18% by weight.

Subsequently, the volatile constituents, especially a majority of the diphenylmethane 4,4'-diisocyanate, were removed as described for polymer DP-1. The polyether urethane polymer thus obtained had an NCO content of 1.8% by weight, a viscosity of 15.2 Pa·s at 20° C. and a diphenylmethane 4,4'-diisocyanate content of 0.08% by weight.

Polymer M:

1000 g of Dynacoll® 7360 and 142 g of diphenylmethane 4,4'-diisocyanate (Desmodur® 44 MC L, from Covestro) were reacted at 80° C. to give a room temperature solid polymer having an NCO content of 2.0% by weight and a diphenylmethane 4,4'-diisocyanate content of 2.3% by weight.

Polymers DP-1 to DP-5 are dimer fatty acid-based polyester urethane polymers. Polymers PP-1 and PP-2 are polyether urethane polymers. Polymer M is a room temperature solid polymer that was used as meltable component.

Moisture-Curing Polyurethane Compositions:

Compositions Z1 to Z5:

For each composition, the ingredients specified in table 1 were well mixed in the amounts specified (in parts by weight) by means of a planetary mixer under reduced pressure and with exclusion of moisture, and the composition was dispensed into a tubular bag with an airtight seal and stored at room temperature.

For rapid curing, a water-containing accelerator component was added to the composition on application. For this purpose, the composition was applied from a PowerCure dispenser (available from Sika Schweiz AG), with metered addition of 2% by weight of a water-containing paste into the composition on expression and mixing-in by means of a dynamic mixer.

Adhesion to residual adhesive bead was determined on a cured and aged adhesive layer. For this purpose, a commercially available polyurethane adhesive for bonding of panes (Sikaflex®-250 SV-3, from Sika Automotive Hamburg GmbH) was applied in the form of a triangular bead of width about 8 mm and height about 10 mm to a glass body, covered with a silicone-coated release paper, pressed to a layer thickness of about 5 mm and cured under standard climatic conditions for 7 days, the release paper was removed and the compressed adhesive bead was aged at 80° C. for 14 days. Subsequently, the cured and aged an adhesive bead was cut away from the glass body down to a layer thickness of about 1 mm.

Thereafter, under standard climatic conditions, the accelerated composition was applied from the PowerCure dispenser in the form of a triangular bead of width about 8 mm and height about 10 mm to strips of silicone-coated release paper. After the wait time specified in each case in table 1, the triangular beads applied to the release paper were upturned and placed onto the residual adhesive bead remaining on the glass body in such a way that the release paper was on top and the composition was in contact with the residual adhesive bead. Subsequently, the composition was pressed to a layer thickness of about 5 mm and cured under standard climatic conditions for 7 d, then the release paper was removed and the adhesion of the cured composition on the residual adhesive bead was tested by making an incision into the cured composition at the narrow end just above the bond surface, holding the incised end of the composition with rounded tweezers and attempting to pull the composition away from the substrate (=residual adhesive bead). Then the composition was incised again down to the substrate, the part that had been cut away was rolled up with the rounded tweezers and an attempt was again made to pull the composition away from the substrate. In this way, the composition was cut away from the substrate by pulling. Subsequently, bonding was assessed with reference to the failure profile using the following scale:

"very good" represents more than 95% cohesive failure,
"good" represents 75% to 95% cohesive failure,
"moderate" represents 50% to 75% cohesive failure,
"poor" represents less than 50% cohesive failure, and
"no adhesion" represents 0% cohesive failure or 100% adhesive failure The results are reported in table 1.

Compositions labeled "(Ref.)" are comparative examples.

TABLE 1

Composition (in parts by weight) and properties of Z1 to Z5.

| Composition | Z1 | Z2 | Z3 | Z4 | Z5 (Ref.) |
|---|---|---|---|---|---|
| Polymer DP-1 | 5.0 | — | — | — | — |
| Polymer DP-2 | — | 5.0 | — | — | — |
| Polymer DP-3 | — | — | 5.0 | — | — |
| Polymer DP-4 | — | — | — | 5.0 | — |
| Polymer PP-1 | 36.8 | 36.8 | 36.8 | 36.8 | 41.8 |
| Polymer M | 2.8 | 2.8 | 2.8 | 2.8 | 2.8 |
| Dioctyl adipate | 17.1 | 17.1 | 17.1 | 17.1 | 17.1 |
| Chalk | 20.0 | 20.0 | 20.0 | 20.0 | 20.0 |

TABLE 1-continued

Composition (in parts by weight) and properties of Z1 to Z5.

| Composition | | Z1 | Z2 | Z3 | Z4 | Z5 (Ref.) |
|---|---|---|---|---|---|---|
| Carbon black | | 18.0 | 18.0 | 18.0 | 18.0 | 18.0 |
| DMDEE [1] | | 0.3 | 0.3 | 0.3 | 0.3 | 0.3 |
| Adhesion to residual adhesive bead | | | | | | |
| after wait time | 0 min | very good | good | very good | very good | moderate |
| | 5 min | very good | good | very good | very good | good |
| | 7 min | very good | good | very good | very good | moderate |
| | 10 min | very good | moderate | very good | good | poor |

[1] 2,2'-dimorpholinodiethyl ether

Compositions Z6 and Z7:

Each composition was produced as described for composition Z1 using the ingredients specified in table 2 in the amounts specified (in parts by weight), dispensed into an aluminum cartridge with an airtight seal, and stored at room temperature.

Each composition was applied between two silicone-coated release papers, pressed to a film of thickness 2 mm and stored under standard climatic conditions for 14 days. After the release papers had been removed, rectangular test specimens (75×150 mm) were cut out of the cured film and tested in a QUV weathering device for the time specified in table 2, and then the weathered surface was tested for carbon black staining by first pressing a transparent adhesive tape onto the surface by hand and then sticking it to a white printer paper. Carbon black staining was rated as "no" if a light gray stain was then visible, carbon black staining was rated as "moderate" in the case of a dark gray stain, and carbon black staining was rated as "severe" in the case of a black stain.

The results are reported in table 2.

Compositions labeled "(Ref.)" are comparative examples.

TABLE 2

Composition (in parts by weight) and properties of Z6 and Z7.

| Composition | Z6 | Z7 (Ref.) |
|---|---|---|
| Polymer DP-1 | 5.0 | — |
| Polymer PP-1 | 22.3 | 27.3 |
| Polymer PP-2 | 10.0 | 10.0 |
| Diisodecyl phthalate | 16.6 | 16.6 |
| Stabilizer[1] | 1.0 | 1.0 |
| Chalk | 25.0 | 25.0 |
| Carbon black | 20.0 | 20.0 |
| 2,2'-Dimorpholinodiethyl ether | 0.1 | 0.1 |
| Carbon black staining: | | |
| 200h QUV | no | moderate |
| 500h QUV | no | severe |
| 3,000h QUV | no | severe |

[1] Tinuvin ® 292 (from BASF)

Compositions Z8 to Z16:

Each composition was produced as described for composition Z1 using the ingredients specified in tables 3 and 4 in the amounts specified (in parts by weight), dispensed into an aluminum cartridge with an airtight seal, and stored at room temperature.

Each composition was tested as follows:

Measures determined for processability or applicability of the composition were expression force, sag resistance and threading. A low expression force, a high sag resistance and short threading are representative of good processability or applicability.

Expression force was determined at 23° C. and at 5° C. A first closed cartridge was stored at 23° C. for 7 days, and a second was stored at 23° C. for 6 days and then at 5° C. for 24 hours. Then the expression force was measured in each case by means of an expression device (Zwick/Roell Z005), by screwing a nozzle of internal diameter 5 mm onto the cartridge and then measuring the force required to express the composition through the nozzle at an expression rate of 60 mm/min. The value reported is the average of the forces that were measured after an expression distance of 22 mm, 24 mm, 26 mm and 28 mm. The sag resistance of each composition was determined by, under standard climatic conditions, applying a triangular bead of width about 8 mm and height about 20 mm to a vertical corrugated cardboard surface in such a way that the triangular bead was arranged as a horizontal strip of width 8 mm with a protruding height (=tip) of 20 mm. After curing under standard climatic conditions, an assessment was made as to whether and how the position of the bead applied had changed. More particularly, the extent to which the tip, measured from the horizontal position, had sagged downward was determined. A sag of less than 1 mm was rated as "very good", 1 to less than 3 mm as "good", 4 to 7 mm as "average", and 8 mm or more as "poor". A "fluid" composition is defined as one where the material applied moved downward, i.e. ran downward, not just at the tip but also at the base of the triangular bead applied.

Threading was determined for some compositions by measuring the length of the thread formed by moving the application cartridge away from the triangular bead that had been applied for determination of sag resistance.

A measure determined for the processing time (open time) was the skin time. For this purpose, a few grams of the composition was applied to cardboard in a layer thickness of about 2 mm and, under standard climatic conditions, the first period of time after which no residues remained any longer on an LDPE pipette used to gently tap the surface of the composition was determined.

For determination of mechanical properties, each composition was pressed between two silicone-coated release papers to give a film of thickness 2 mm and stored under standard climatic conditions for 14 days. After removing the release papers, some test specimens were punched out and tested as described as follows:

For determination of tensile strength ("TS"), elongation at break (EaB) and modulus of elasticity at 0.5-5% elongation, dumbbells having a length of 75 mm with a bar length of 30 mm and a bar width of 4 mm were punched out of the film, and these were tested to DIN EN 53504 at a strain rate of 200 mm/min.

A number of test specimens were also punched out for determination of tear resistance and were tested in accordance with DIN ISO 34 at a strain rate of 500 mm/min.

Appearance and gloss were determined visually for the determination of the mechanical properties produced film. "Nice" was used to describe a nontacky, even film without blisters.

To determine the strength of an adhesive bond, lap shear strength (LSS) for some compositions was determined on glass. For this purpose, composite specimens were produced by bonding two glass plates that had been degreased with isopropanol and pretreated with Sika® Aktivator 100 (from Sika Schweiz) in such a way that the overlapping adhesive bond had dimensions of 12×25 mm and a thickness of 4 mm and the glass plates protruded at the top ends. After the composite specimens had been stored under standard climatic conditions for 14 d, lap shear strength was tested to DIN EN 1465 at a strain rate of 20 mm/min. As a measure of the heat and hydrolysis stability of the bond, further test specimens were additionally stored in an air circulation oven at 100° C. for 7 days or at 70° C./100% relative humidity for 7 days, cooled down under standard climatic conditions and tested in the same way. The results are given the addition "14d SCC" or "7d 100° C." or "7d 70/100".

The results are reported in tables 3 and 4.

Compositions labeled "(Ref.)" are comparative examples.

TABLE 3

Composition (in parts by weight) and properties of Z8 to Z13.

| Composition | Z8 | Z9 (Ref.) | Z10 | Z11 (Ref.) | Z12 | Z13 (Ref.) |
|---|---|---|---|---|---|---|
| Polymer DP-1 | 5.0 | — | 5.0 | — | 5.0 | — |
| Polymer PP-1 | 36.8 | 41.8 | 38.2 | 43.2 | 39.6 | 44.6 |
| Polymer M | 2.8 | 2.8 | 1.4 | 1.4 | — | — |
| Dioctyl adipate | 17.1 | 17.1 | 17.1 | 17.1 | 17.1 | 17.1 |
| Chalk | 20.0 | 20.0 | 20.0 | 20.0 | 20.0 | 20.0 |
| Carbon black | 18.0 | 18.0 | 18.0 | 18.0 | 18.0 | 18.0 |
| DMDEE[1] | 0.3 | 0.3 | 0.3 | 0.3 | 0.3 | 0.3 |
| Expression 23° C. | 809 | 919 | 653 | 616 | 471 | 249 |
| force [N]    5° C. | 1002 | 1235 | 812 | 869 | 685 | 468 |
| Sag resistance | very good | very good | very good | moderate | very good | poor. fluid |
| Thread formation [mm] | 6 | 5 | 8 | 11 | 12 | n.m. |
| Skin time [min] | 17 | 17 | 17 | 18 | 17 | 22 |
| Tensile strength [MPa] | 8.4 | 7.7 | 8.3 | 7.6 | 8.6 | 8.2 |
| Elongation at break [%] | 502 | 487 | 490 | 466 | 513 | 477 |
| Modulus of elasticity [MPa] | 6.1 | 5.8 | 5.5 | 5.2 | 4.6 | 4.0 |
| Tear resistance [N/mm] | 12.3 | 11.7 | 12.0 | 11.2 | 11.7 | 10.0 |
| Appearance/gloss | nice/matt | nice/glossy | nice/matt | nice/glossy | nice/matt | nice/glossy |
| LSS [MPa]  14 d SCC | 4.7 | 4.5 | 4.1 | 4.5 | 4.6 | 4.2 |
| 7 d 100° C. | 5.9 | 5.8 | 7.0 | 5.5 | 5.3 | 6.8 |
| 7 d 70/100 | 5.2 | 5.3 | 5.0 | 3.2 | 5.2 | 3.5 |

[1]2,2'-dimorpholinodiethyl ether

TABLE 4

Composition (in parts by weight) and properties of Z14 to Z16.

| Composition | Z14 | Z15 | Z16 |
|---|---|---|---|
| Polymer DP-2 | 5.0 | — | — |
| Polymer DP-3 | — | 5.0 | — |
| Polymer DP-4 | — | — | 5.0 |
| Polymer PP-1 | 36.8 | 36.8 | 36.8 |
| Polymer M | 2.8 | 2.8 | 2.8 |
| Dioctyl adipate | 17.1 | 17.1 | 17.1 |
| Chalk | 20.0 | 20.0 | 20.0 |
| Carbon black | 18.0 | 18.0 | 18.0 |
| 2,2'-Dimorpholinodiethyl ether | 0.3 | 0.3 | 0.3 |
| Expression force [N] 23° C. | 959 | 633 | 539 |
| Sag resistance | very good | very good | very good |
| Skin time [min] | 17 | 16 | 16 |
| Tensile strength [MPa] | 7.8 | 6.9 | 7.4 |
| Elongation at break [%] | 472 | 493 | 482 |
| Modulus of elasticity [MPa] | 8.1 | 5.1 | 5.6 |
| Tear resistance [N/mm] | 13.6 | 12.5 | 11.4 |
| Appearance/gloss | nice/matt | nice/matt | nice/matt |

The invention claimed is:

1. A room temperature liquid polyester urethane polymer containing isocyanate groups, obtained from the reaction of reactants consisting of at least one monomeric diisocyanate and a dimer fatty acid-based polyester diol having an OH number in the range from 28 to 60 mg KOH/g in an NCO/OH ratio of at least 3/1, followed by removal of a majority of the monomeric diisocyanate by means of a suitable separation method,
  wherein the polyester urethane polymer has an NCO content in the range from 1.5% to 6% by weight and a monomeric diisocyanate content of not more than 0.5% by weight.

2. The polyester urethane polymer as claimed in claim 1, wherein the monomeric diisocyanate is diphenylmethane 4,4'-diisocyanate.

3. The polyester urethane polymer as claimed in claim 1, wherein the dimer fatty acid-based polyester diol is amorphous.

4. The polyester urethane polymer as claimed in claim 1, wherein the NCO/OH ratio is in the range from 3/1 to 10/1.

5. The polyester urethane polymer as claimed in claim 1, wherein it has a viscosity at 20° C. in the range from 100 to 1,000 Pa·s, determined with a cone-plate viscometer having a cone diameter 25 mm, cone angle 1, cone tip-plate distance of 0.5 mm, at a shear rate of 50 s$^{-1}$.

6. The use of the polyester urethane polymer as claimed in claim 1 as adhesion promoter in a moisture-curing polyurethane composition.

7. The use as claimed in claim 6, wherein the polyester urethane polymer is used in an amount in the range from 0.5% to 15% by weight, based on the overall polyurethane composition.

8. A moisture-curing polyurethane composition suitable as elastic adhesive and/or sealant, comprising
  at least one polyether urethane polymer containing isocyanate groups, and
  the polyester urethane polymer containing isocyanate groups as claimed in claim 1.

9. The moisture-curing polyurethane composition as claimed in claim 8, wherein the polyether segments in the polyether urethane polymer consist of at least 80% 1,2-propyleneoxy units.

10. The moisture-curing polyurethane composition as claimed in claim 8, wherein the polyether urethane polymer has an NCO content in the range from 1% to 5% by weight.

11. The moisture-curing polyurethane composition as claimed in claim 8, wherein at least one further constituent selected from meltable components, blocked amines, fillers, plasticizers, diisocyanate oligomers, catalysts and stabilizers is present.

12. The moisture-curing polyurethane composition as claimed in claim 8, wherein it contains
   20% to 60% by weight of polyether urethane polymer containing isocyanate groups,
   0.5% to 10% by weight of inventive dimer fatty acid-based polyester urethane polymer containing isocyanate groups,
   0% to 5% by weight of meltable component,
   20% to 60% by weight of fillers,
   0% to 35% by weight of plasticizers,
   and optionally further constituents.

13. The moisture-curing polyurethane composition as claimed in claim 8, wherein a total of less than 0.1% by weight of monomeric diisocyanates is present.

14. A method of bonding or sealing, comprising the steps of
   (i) applying the polyurethane composition as claimed in claim 8
      to a first substrate and contacting the composition with a second substrate within the open time of the composition, or
      to a first and to a second substrate and joining the two substrates within the open time of the composition, or
      between two substrates,
   (ii) curing the composition by contact with moisture.

15. An article obtained from the method as claimed in claim 14.

16. The polyester urethane polymer as claimed in claim 1, wherein the OH number of the dimer fatty acid-based polyester diol is in the range from 34 to 60 mg KOH/g.

17. The moisture-curing polyurethane composition as claimed in claim 8, wherein the composition can be applied and cured at room temperature.

* * * * *